US011314428B1

(12) United States Patent  
Ravimohan et al.

(10) Patent No.: US 11,314,428 B1
(45) Date of Patent: Apr. 26, 2022

(54) STORAGE SYSTEM AND METHOD FOR DETECTING AND UTILIZING WASTED SPACE USING A FILE SYSTEM

(71) Applicant: Western Digital Technologies, Inc., San Jose, CA (US)

(72) Inventors: Narendhiran Chinnaanangur Ravimohan, Bangalore (IN); Kavya Bathula, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/182,499

(22) Filed: Feb. 23, 2021

Related U.S. Application Data

(60) Provisional application No. 63/089,685, filed on Oct. 9, 2020.

(51) Int. Cl.
*G06F 3/06* (2006.01)

(52) U.S. Cl.
CPC .......... *G06F 3/0631* (2013.01); *G06F 3/0608* (2013.01); *G06F 3/0644* (2013.01); *G06F 3/0665* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,561,786 A * | 10/1996 | Morse | G06F 12/023 711/170 |
| 5,806,072 A * | 9/1998 | Kuba | H04N 1/2112 |
| 7,275,139 B1 * | 9/2007 | Tormasov | G06F 3/0623 711/159 |
| 7,603,529 B1 * | 10/2009 | MacHardy | G06F 3/0608 707/999.202 |
| 7,739,312 B2 | 6/2010 | Gordon et al. | |
| 7,783,923 B2 | 8/2010 | Shen et al. | |
| 8,291,155 B2 | 10/2012 | Lai et al. | |
| 8,370,401 B2 | 2/2013 | Gordon et al. | |
| 8,521,790 B2 | 8/2013 | Best et al. | |
| 8,904,136 B2 | 12/2014 | Sobel | |
| 8,966,209 B2 * | 2/2015 | Post | G06F 12/0246 711/170 |
| 10,817,417 B1 * | 10/2020 | Zhang | G06F 12/0292 |
| 2001/0013090 A1 * | 8/2001 | Sandstrom | G06F 12/0261 711/147 |
| 2007/0088912 A1 * | 4/2007 | Mukherjee | G06F 3/0656 711/112 |
| 2008/0091702 A1 * | 4/2008 | Pudipeddi | G06F 16/18 |
| 2010/0082537 A1 * | 4/2010 | Lasser | G06F 16/13 707/610 |
| 2012/0047316 A1 * | 2/2012 | Post | G06F 3/061 711/103 |
| 2013/0179626 A1 * | 7/2013 | Chang | G06F 12/1009 711/103 |
| 2018/0089216 A1 * | 3/2018 | Boutnaru | G06F 16/1734 |
| 2019/0121547 A1 * | 4/2019 | Frolikov | G06F 3/0607 |
| 2020/0110536 A1 * | 4/2020 | Navon | G06F 3/0613 |

* cited by examiner

*Primary Examiner* — Ramon A. Mercado

(74) *Attorney, Agent, or Firm* — Crowell & Moring LLP

(57) ABSTRACT

A file system in a storage system can store files received from a host in clusters of memory in the storage system. An end portion of a file may not use the entire cluster. As a result, the end clusters of the stored files can contain unused space. A system and method detects the unused space in such clusters and creates a virtual cluster from the unused space.

20 Claims, 11 Drawing Sheets

Occupied space (file 1)

Occupied space (file 2)

| Host 1 | | | |
|---|---|---|---|
| Card Capacity | Avg Image File Size in MB | Total Number of Images on Card | Total Size of Image Files | Total Space Occupied by Image Files on Card | Wasted Space (percentage of card capacity) |
| 512GB | 4.54 | 102753 | 456GB | 476GB | 20GB (4.2%) |
| 1TB | 4.54 | 195257 | 866GB | 953GB | 87GB (9.1%) |

FIG. 5A

| Host 2 | | | |
|---|---|---|---|
| Card Capacity | Avg Image File Size in MB | Total Number of Images on Card | Total Size of Image Files | Total Space Occupied by Image Files on Card in GB | Wasted Space (percentage of card capacity) |
| 512GB | 3.34 | 139448 | 456GB | 476GB | 20GB (4.2%) |
| 1TB | 3.34 | 278933 | 912GB | 953GB | 41GB (4.3%) |

FIG. 5B

| Host 3 | | | |
|---|---|---|---|
| Card Capacity | Avg Image File Size in MB | Total Number of Images on Card | Total Size of Image Files | Total Space Occupied by Image Files on Card | Wasted Space (percentage of card capacity) |
| 512GB | 3.75 | 122019 | 447GB | 476GB | 29GB (6%) |
| 1TB | 3.75 | 244070 | 894GB | 953GB | 59GB (6.2%) |

FIG. 5C

STORAGE SYSTEM AND METHOD FOR DETECTING AND UTILIZING WASTED SPACE USING A FILE SYSTEM

CROSS-REFERENCE TO RELATED APPLICATION

This application claims the benefit of U.S. provisional patent application No. 63/089,685, filed Oct. 9, 2020, which is hereby incorporated by reference.

BACKGROUND

A host can provide a file to a storage system for storage. A file system in the storage system can store the file in units of clusters, which are typically greater than the minimum programmable unit of the memory (e.g., a sector). The storage of a file can result in wasted space in a cluster, as the end of the file may consume some, but not all, of the cluster.

BRIEF DESCRIPTION OF THE DRAWINGS

FIGS. 5A, 5B, and 5C are illustrations of wasted space in memory systems of an embodiment when the memory systems are used with different hosts.

DETAILED DESCRIPTION

By way of introduction, the below embodiments relate to a storage system and method for detecting and utilizing wasted space using a file system. As mentioned above, the storage of files in a storage system can result in unused space in clusters that store the end portions of the files. The following embodiments can be used to create virtual clusters from the unused space.

Figure 1A:
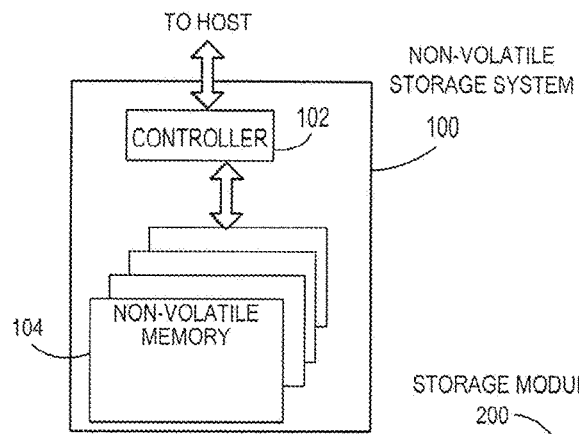
FIG. 1A is a block diagram of a non-volatile storage system of an embodiment.
Figure 1B:
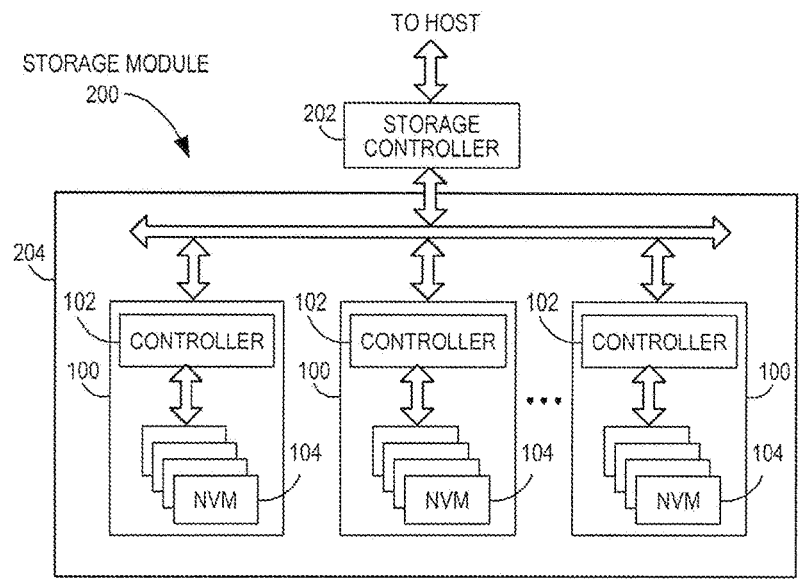
FIG. 1B is a block diagram illustrating a storage module of an embodiment.
Figure 1C:
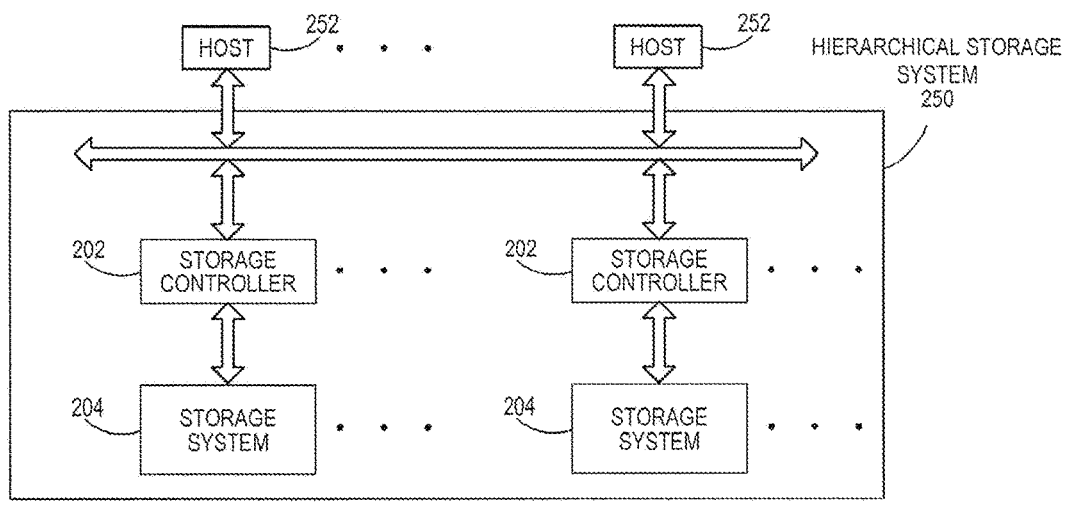
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
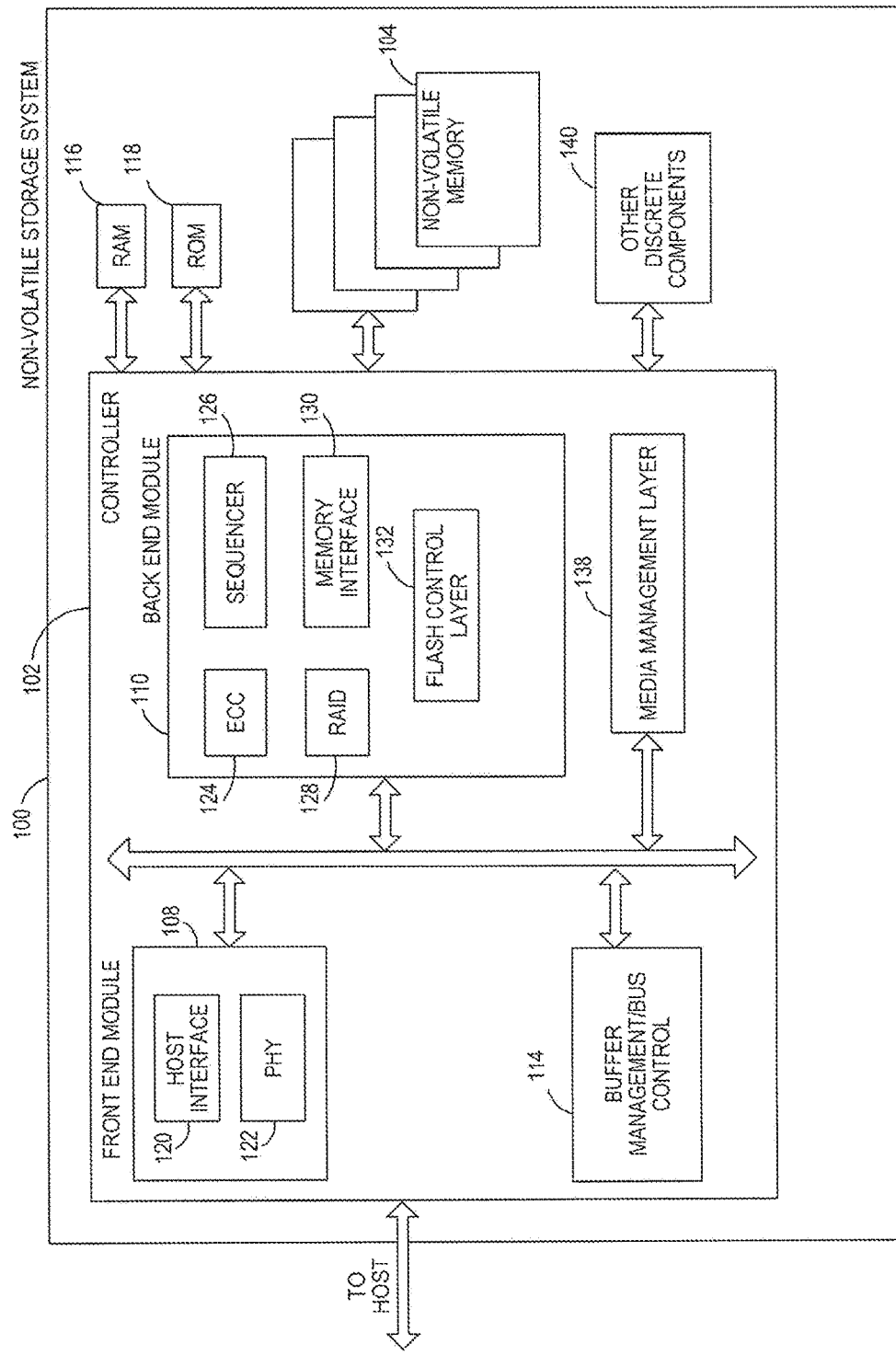
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
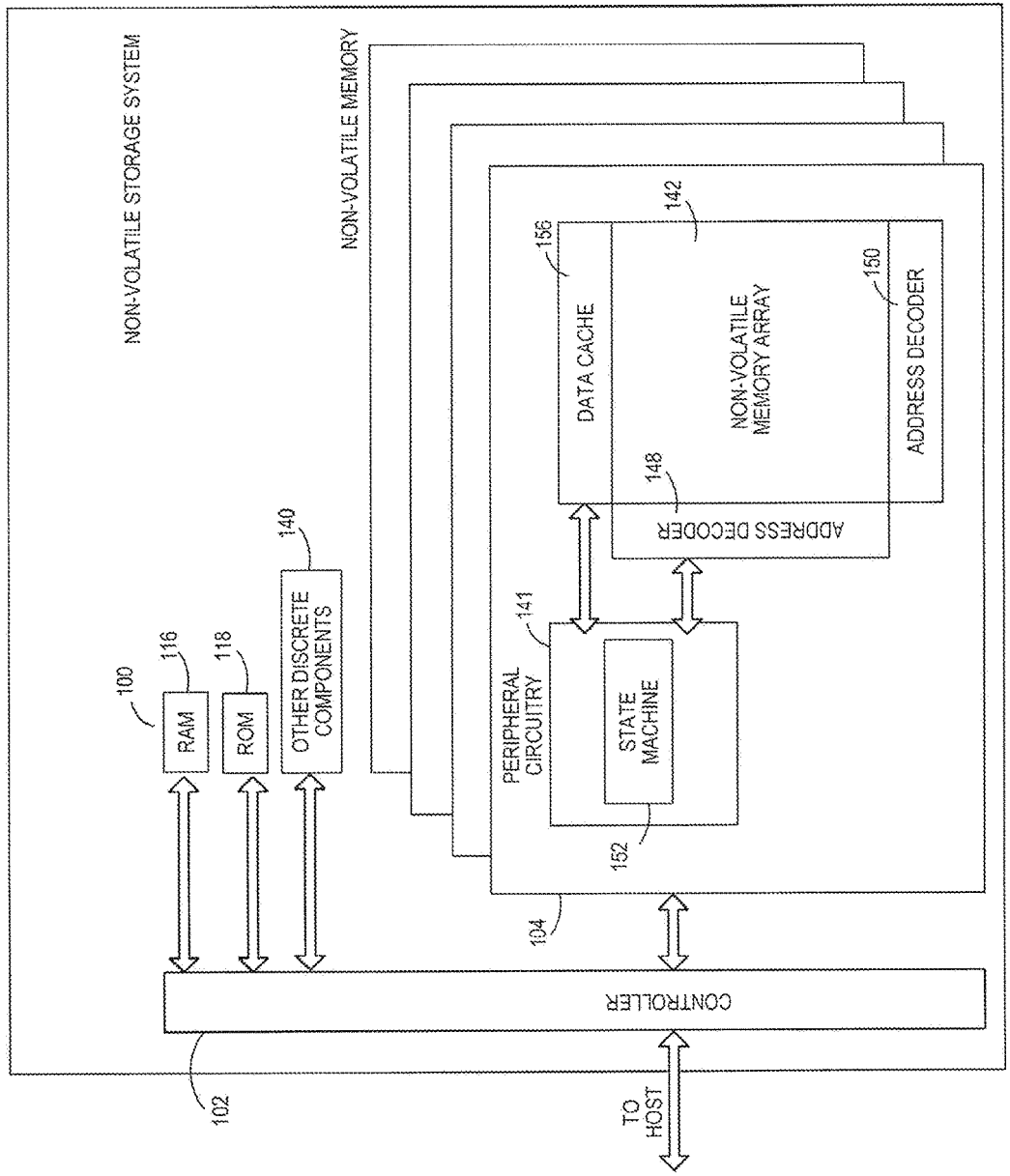
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
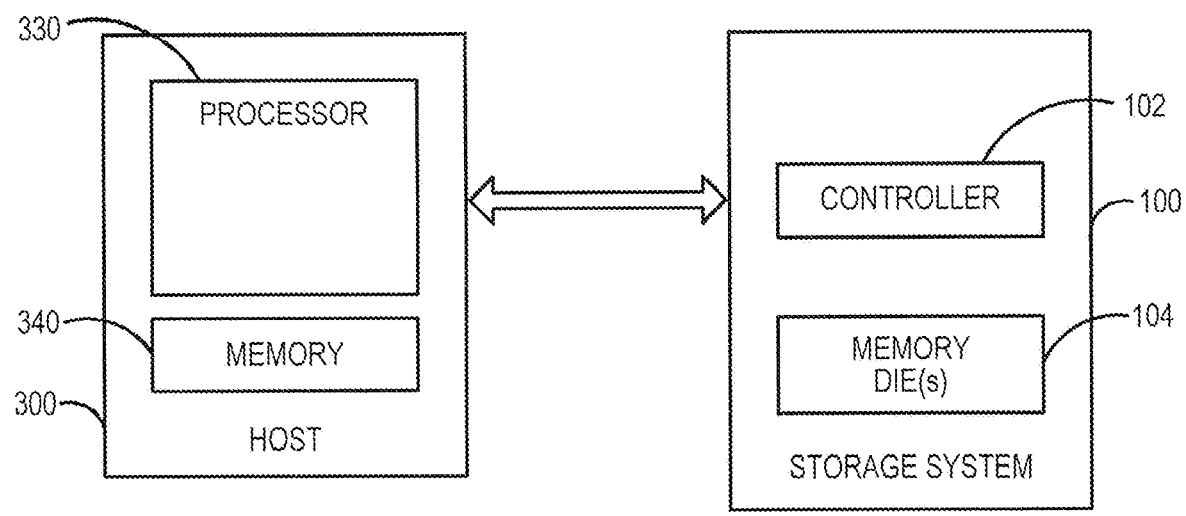
FIG. 3 is a diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

Figure 4:
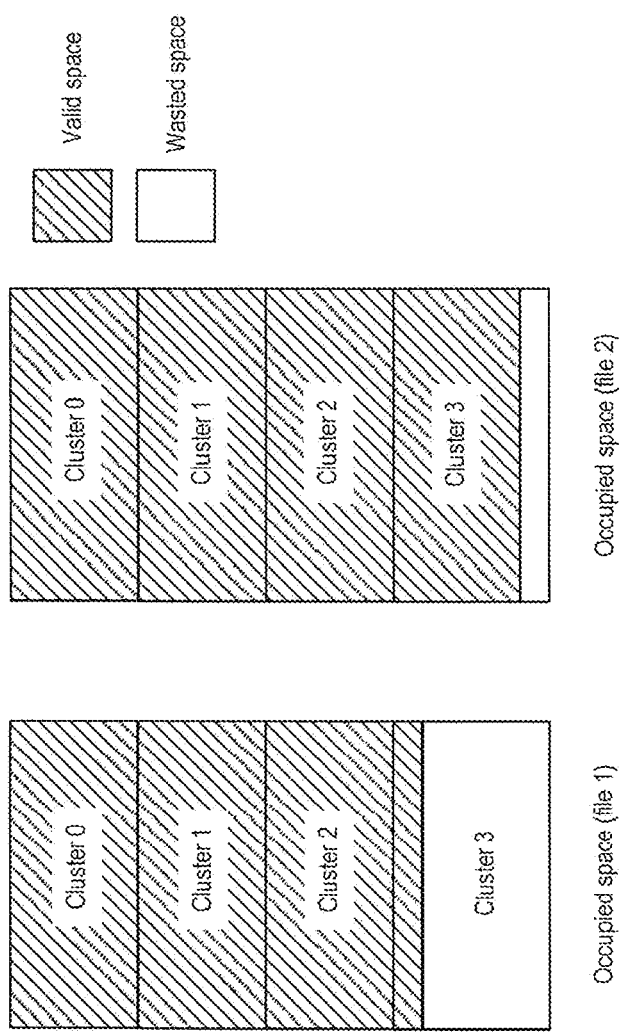
FIG. 4 is an illustration of occupied space of first and second files of an embodiment.

File systems used on external storage systems (e.g., drives, cards) can store host data in units of clusters. In one embodiment, the size of a cluster is greater than the size of a sector, which is the minimum programmable unit (e.g., 512 bytes). Flash memories can use FAT32 and exFAT file systems, and the exFAT file system has a default cluster size of 128 kilobyte (KB). So, a 257 KB file would take up three clusters (384 KB), and 127 KBs out of 128 KBs in the last cluster would be free but unavailable for other writes until the file is present in the card. Similarly, a 383 KB file would also consume up three clusters (384 KB), with 1 KB out of 128 KBs in last cluster being free but unavailable. These example are illustrated in FIG. 4.

FIGS. 5A, 5B, and 5C are illustrations of wasted space in 512 gigabyte (GB) and 1 terabyte (TB) capacity memory systems of an embodiment when the memory systems are used with different hosts. As shown in these figures, at least 4% of memory capacity becomes wasted space upon filling the memory system (e.g., a SD or microSD card) with images in different hosts: 20 GB in a 512 GB (476 GB user capacity) card and 41 GB in a 1 TB (953 GB user capacity) card. These sectors are not written to the card as there is no host data, but they are not available to user either.

Figure 6:
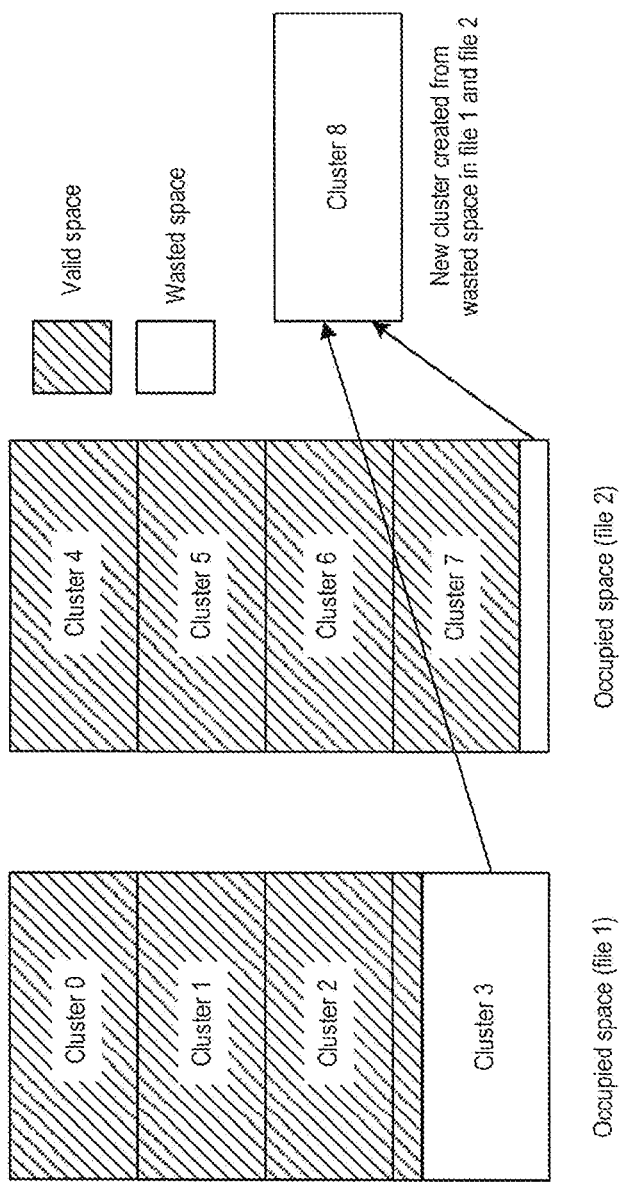
FIG. 6 is an illustration of a virtual cluster of an embodiment created from wasted space in clusters storing of first and second files.

The following embodiments can be used to convert this wasted space/slack space into available capacity for the user. More specifically, with reference to FIG. 6, the controller 102 in the storage system 100 of this embodiment identifies the wasted space at the end of a file in each cluster and concatenates the wasted space to create virtual clusters. Any suitable process can be used to achieve this result. The following paragraphs described one example implementation. It should be understood that this is merely an example and other implementations can be used.

In this example, both the file creation and file deletion processes are involved in being able to create a virtual cluster from wasted space. In the file creation process, the controller 102 (e.g., firmware) reads the boot record to know the cluster size in terms of sectors and the location of the root directory, which has directory entries for all files. From the directory entry of a file, its start cluster and actual file size in bytes are identified. From the FAT table and allocation bitmap, the end cluster of the file is detected. The actual file size is used to calculate the number of free fragments (e.g., 8 sectors, which is the minimum size for a global address table (GAT) control page entry) in the end cluster. The GAT entries of these fragments can be marked invalid in the GAT page, so this space is not in use. Then, the controller 102 adds this fragment count to an internal counter.

The controller 102 then repeats the above steps until the internal counter reaches a threshold (e.g., 64 MB). After that, the controller 102 pads the FAT table and allocation bitmap (bitmap used in ExFAT only) with extra entries created for the new virtual clusters. The new virtual clusters are marked available in these entries by the controller (firmware) 102. Storage systems have a greater file system size allotted during formatting than needed, and the extra capacity added is limited to a percentage of the card capacity (e.g., 15%), so the FAT size/allocation bitmap size need not be changed for this operation. For example, an ExFAT with a cluster size of 0x200 sectors needs only 16 KB more in the FAT table and 512 bytes more in the allocation bitmap for 1 GB of extra capacity.

The controller 102 notes, in a mapping table, the wasted space of each file along with the file name and the virtual cluster that will use this space. This mapping table has two purposes: (1) handling file deletions (explained below) and (2) retrieving only new file data from the table for wasted space collection instead of going through all the files in the card in the next check.

Based on the FAT/allocation bitmap change by the controller 102, when file system data from the storage system 100 is re-read by the host 300, the total capacity and free space seen by the host 300 change reflecting the extra capacity. This file system refresh can be device-initiated or host-polled after one or more file writes. The controller 102 then resets the internal counter and, using the mapping table, searches new files for wasted space by repeating the above steps.

Figure 7:
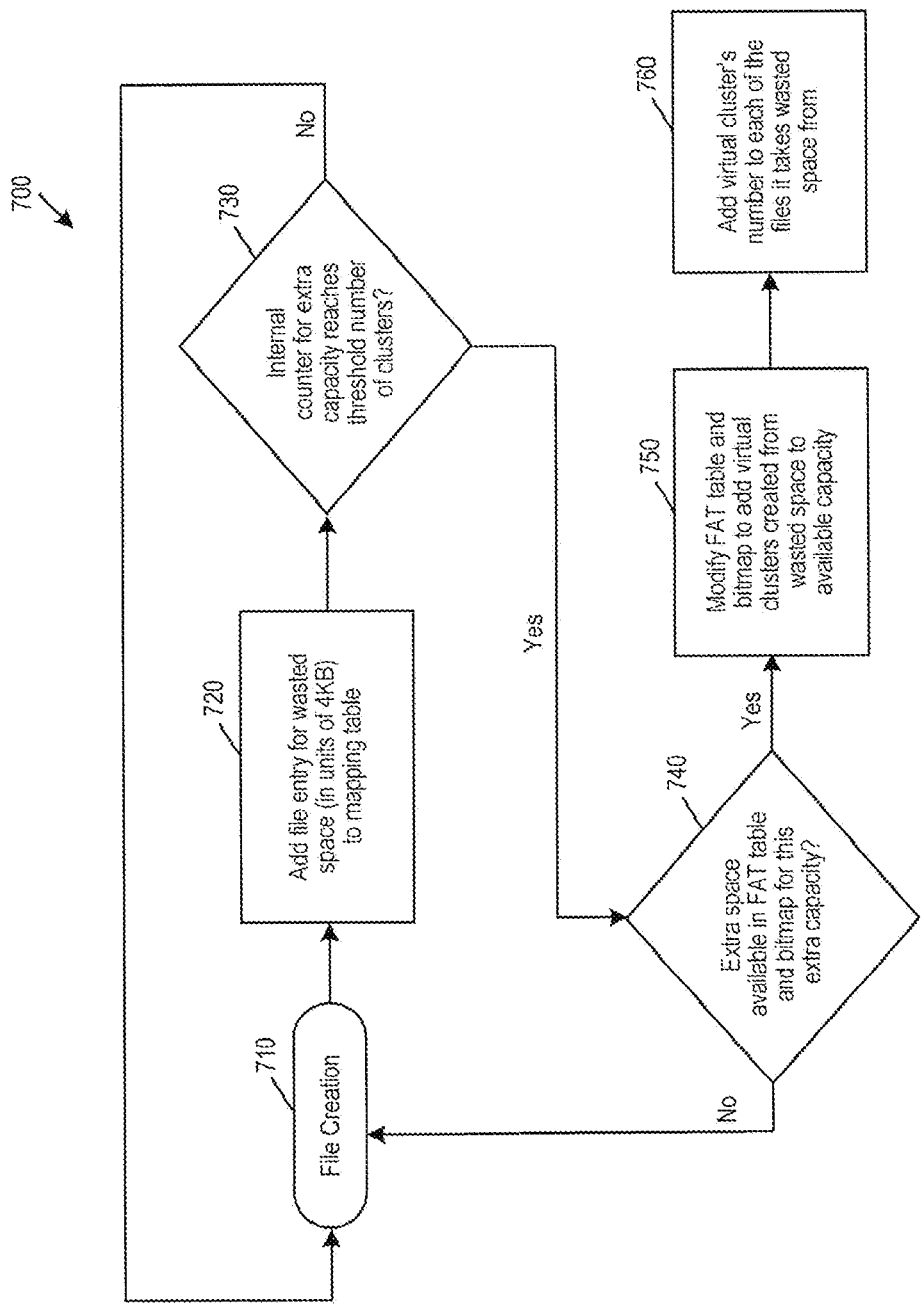
FIG. 7 is a flow chart of a file creation method of an embodiment.

This file creation method is summarized in the flow chart 700 in FIG. 7. As shown in FIG. 7, in this embodiment, at the start of the file creation process (act 710), a file entry is added for wasted space (e.g., in units of 4 KB) in a mapping table (act 720). Then, the controller 102 determines if an internal counter for the extra capacity reaches a threshold number of clusters (act 730). If it does, the controller 102 then determines if there is extra space available in the FAT table and bitmap for this extra capacity (act 740). If there is, the controller 102 modifies the FAT table and bitmap to add virtual clusters created from the virtual space to the available capacity (act 750). The controller 102 then adds the virtual cluster's number to each of the files it takes wasted space from (act 760).

As mentioned above, the mapping table also handles file deletions, as this embodiment does not reduce memory capacity beneath its original capacity. If any file is deleted, the host 300 marks its clusters as available in the FAT (for FAT32 or FAT64) or allocation bitmap (for exFAT). From time to time, the controller 102 scans the root directory for any deleted file entries (the first byte of the directory entry has the deleted flag). If the controller 102 detects a deleted file and if that file has an entry in the mapping table, one of the below actions is chosen based on corresponding virtual cluster availability. In case the virtual cluster from the file entry in the mapping table is available, the controller 102 marks it unavailable in the FAT/allocation bitmap (thus releasing wasted space taken from the end cluster of the file back to the cluster). This ensures that additional fragmentation of the files in the storage system 100 is not done by this scheme. In case the virtual cluster from the file entry in the mapping table has valid data, the controller 102 marks the end cluster of the file unavailable in the FAT/allocation bitmap. New writes cannot use the last cluster of the deleted file as part of it is already in use in the virtual cluster. Now, all file clusters but the last one are available.

On file deletion, there is one cluster reduction in extra capacity seen by the host 300 as either a virtual cluster or an end cluster of the file that is marked unavailable in the FAT/allocation bitmap by the controller 102. When file system data from the storage system 100 is re-read by the host 300, the total capacity and free space seen by the host 300 change to reflect this reduced extra capacity. This file system refresh can be device-initiated or host-polled on each file deletion.

Figure 8:
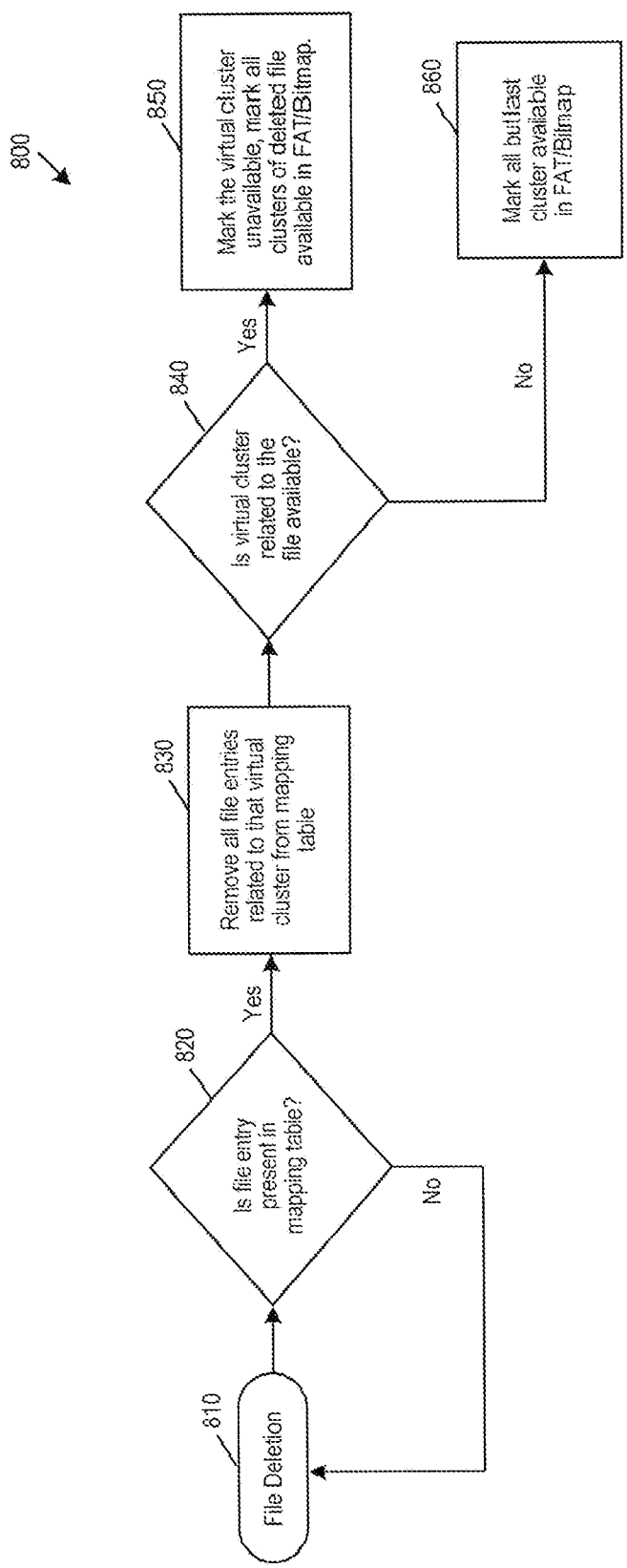
FIG. 8 is a flow chart of a file deletion method of an embodiment.

This file deletion process is summarized in the flow chart 800 in FIG. 8. As shown in FIG. 8, at the start of the file deletion process (act 810), the controller 102 determines if the file entry is present in the mapping table (act 820). If it is, the controller 102 removes all file entries related to that virtual cluster from the mapping table (act 830). The controller 102 then determines if the virtual cluster related to the file is available in the FAT/bitmap (act 840). If the virtual cluster is available, the controller 102 marks the virtual cluster unavailable and marks all clusters of the deleted file available in the FAT/bitmap (act 850). If the virtual cluster is not available, the controller 102 marks all but the end cluster of file as available in the FAT/bitmap (act 860).

There are several advantages associated with these embodiments. As mentioned above, these embodiments provide dynamic conversion of wasted space to free space that the host/user can use (e.g., at least 4% of device capacity when the device is filled with medium-sized files). For example, by providing wasted space as extra capacity to the user/host, these embodiments can provide an extra 20 GBs of space in a 512 GB SD card and an extra 41 GBs of space in a 1 TB SD card. While these embodiments can be used in any suitable application, these embodiments may find particular use for file types that are not edited in place by the host 300 (e.g., text or Excel files).

Figures 9, 10:
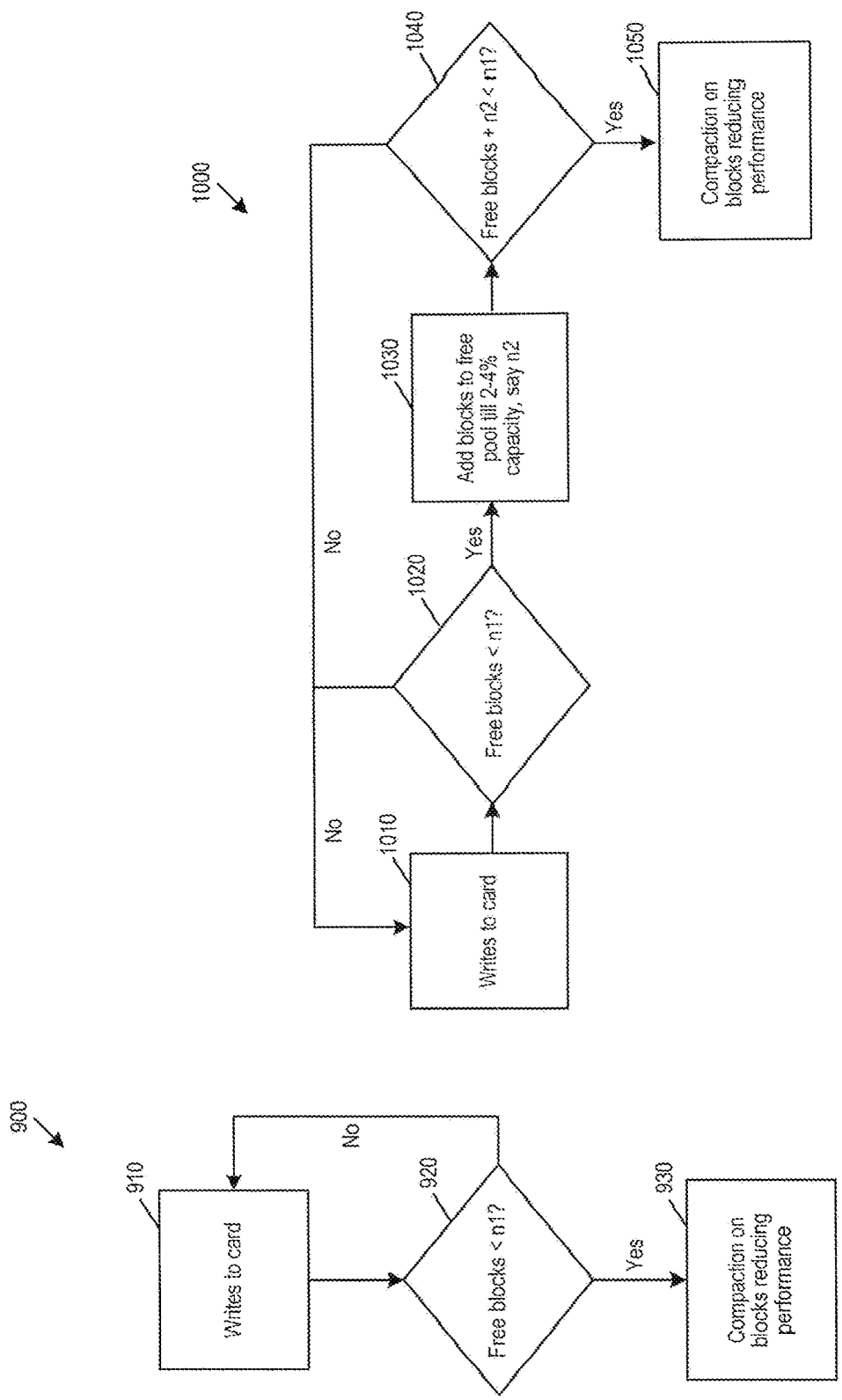
FIG. 9 is a flow chart of a compaction method of an embodiment.
FIG. 10 is a flow chart of a compaction method of an embodiment that can be used to improve memory yield.

There are many alternatives that can be used with these embodiments. For example, these embodiments can be used to allow the repurposed wasted space to improve card endurance and sustained performance during compaction. FIG. 9 is a flow chart 900 of a standard compaction method. As shown in FIG. 9, when there are writes to the storage system (here, a card) (act 910), the controller 102 determines if the number of free blocks is less than n1 (act 920). If it is, the controller 102 performs compaction on the blocks, reducing performance (act 930). In contrast, FIG. 10 is a flow chart 1000 of a compaction method that uses these embodiments to improve memory yield. As shown in FIG. 10, when there are writes to the storage system (here, card) (act 1010), the controller 102 determines if the number of free blocks is less than n1 (act 1020). If it is, the controller 102 adds blocks to the free pool until there is 2-4% capacity (n2) (act 1030). Then, the controller 102 determines if the number of free blocks plus n2 is less than n1 (act 1040). If it is, the controller 102 performs compaction on the blocks (act 1050).

Using these embodiments to provide extra blocks for runtime block overprovisioning has several advantages. First, storage system endurance (e.g., product cycles) increases as there are more blocks. Second, sustained performance of the storage system 100 increases, as the garbage collection or compaction threshold is hit less often when more blocks are available. This results in fewer occurrences of garbage collection/compaction.

Figure 11:
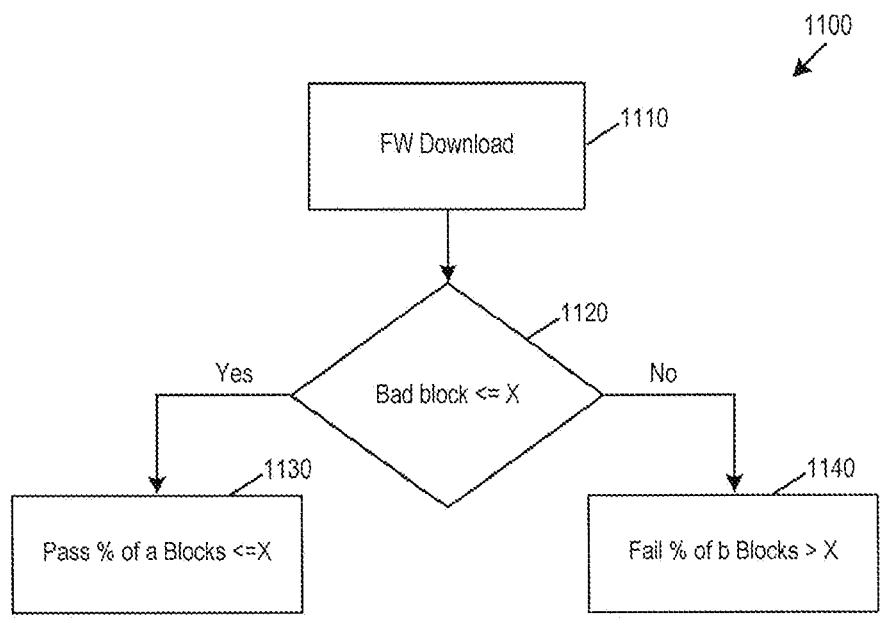
FIG. 11 is a flow chart of a firmware download method of an embodiment.
Figure 12:
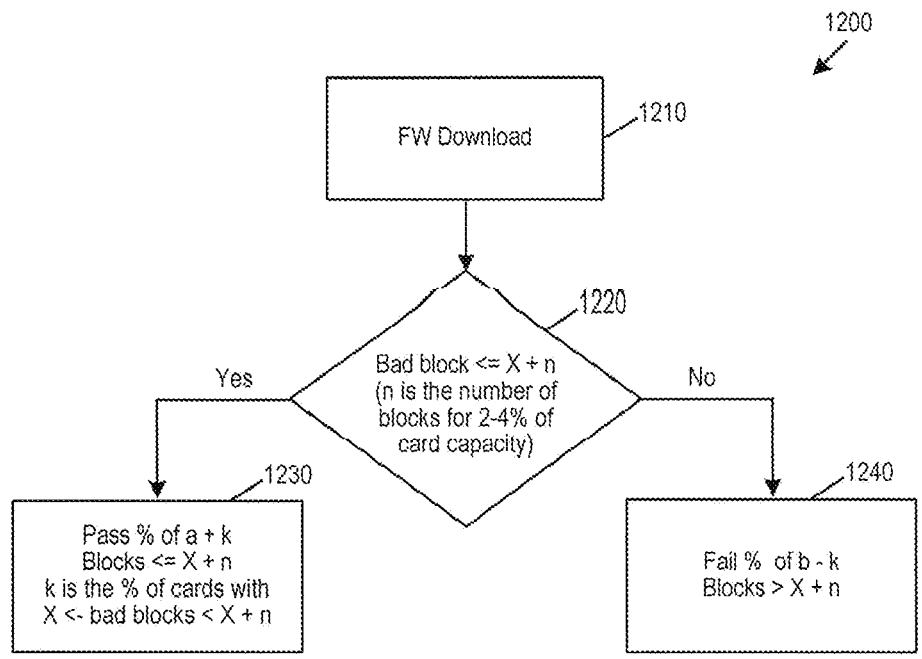
FIG. 12 is a flow chart of a firmware download method of an embodiment that can be used to improve memory yield.

In another alternative, the embodiments can be used to improve memory yield during a firmware download. FIG. 11 is a flow chart 1100 of a typical firmware download process. As shown in FIG. 11, after a firmware download (act 1110), the controller 102 determines if the number of bad blocks is less than or equal to X (act 1120). If it is, the pass percentage of "a" blocks is less than or equal to X (act 1130). If it is not, the fail percentage of "b" blocks is greater than X (act 1140). In contrast, FIG. 12 is a flow chart 1200 of a firmware download method that uses these embodiments to improve memory yield. As shown in FIG. 12, after a firmware download (act 1210), the controller 102 determines if the number of bad blocks is less than or equal to X plus n, where n is the number of blocks for a 2-4% capacity card (act 1220). If it is, the pass percentage of "a" plus "k" blocks is less than or equal to X plus n, where k is the percent of cards with X less than the bad blocks, which is less than X plus n (act 1230). If it is not, the fail percentage of "b"−k blocks is greater than X plus n (act 1240).

By using these embodiments to provide extra blocks (e.g., 2-4% of card capacity), these extra blocks can be added to the bad block limit allowed during a firmware download. This increases the memory yield as a storage system with bad blocks between the original limit and the increased limit become usable. This improves yield loss and effectively reduces the cost per GB of memory.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
store plurality of files in the memory, wherein storage of the plurality of files results in unused space in a plurality of clusters of memory;
identify the unused space in the plurality of clusters;
in response to the unused space exceeding a threshold, determine whether space is available in a file allocation table for repurposing the unused space in the plurality of clusters; and in response to determining that space is available in the file allocation table, create a virtual cluster from the unused space in the plurality of clusters.

2. The storage system of claim 1, wherein the controller is further configured to identify the unused space from a start cluster, an end cluster, and a file size of each of the plurality of files.

3. The storage system of claim 2, wherein the start clusters and file sizes are stored in directory entries for the plurality of files.

4. The storage system of claim 3, wherein the directory entries are stored in a root directory, and wherein the controller is further configured to read a boot record to identify a location of the root directory.

5. The storage system of claim 2, wherein the controller is further configured to identify the end clusters from file allocation structures.

6. The storage system of claim 1, wherein the controller is further configured to add the identified unused space to a counter.

7. The storage system of claim 6, wherein the controller is further configured to create the virtual cluster from the unused space in response to a value of the counter reaching a second threshold.

8. The storage system of claim 1, wherein the controller is further configured to, in response to a command to delete a file of the plurality of files:
   determine whether the virtual cluster related to the file contains valid data;
   in response to determining that the virtual cluster does not contain valid data, mark the virtual cluster as unavailable; and
   in response to determining that the virtual cluster contains valid data, mark an end cluster for the file as unavailable.

9. The storage system of claim 1, wherein the controller is further configured to use the unused space to improve endurance and/or performance during a memory compaction process.

10. The storage system of claim 1, wherein the controller is further configured to use the virtual cluster to improve memory yield during a firmware download process.

11. In a storage system comprising a memory, a method comprising:
   storing a plurality of files in the memory, wherein storage of the plurality of files consumes some, but not all, memory locations allocated for the plurality of files;
   identifying unused space in the memory locations;
   in response to the unused space exceeding a threshold, determining whether space is available in a file allocation table for repurposing the unused space in the memory locations; and
   in response to determining that space is available in the file allocation table, creating a virtual memory location from the unused space.

12. The method of claim 11, further comprising identifying the unused space from a start cluster, an end cluster, and a file size of each of the plurality of files.

13. The method of claim 12, further comprising reading a boot record to identify, a location of a root directory, wherein the root directory stores directory entries that store the start clusters and file sizes.

14. The method of claim 12, further comprising identifying the end clusters from file allocation structures.

15. The method of claim 11, further comprising:
   adding the unused space to a counter; and
   creating the virtual memory location in response to a value of the counter reaching a second threshold.

16. The method of claim 11, further comprising using the virtual memory location to improve memory yield during a memory compaction process or during a firmware download process.

17. A storage system comprising:
   a memory;
   means for storing a plurality of files in the memory, wherein storage of the plurality of files results in unused space in a plurality of clusters of memory;
   means for identifying the unused space in the plurality of clusters;
   means for, in response to the unused space exceeding a threshold, determining whether space is available in a file allocation table for repurposing the unused space in the plurality of clusters; and
   means for creating a virtual cluster from the unused space in response to determining that space is available in the file allocation table.

18. The storage system of claim 17, wherein the unused space is identified from a start cluster, an end cluster, and a file size of each of the one or more files.

19. The storage system of claim 18, wherein the end clusters are stored in file allocation structures, wherein the start clusters and file sizes are stored in directory entries for the one or more files, wherein the directory entries are stored in a root directory, and wherein a location of the root directory is identified in a boot record.

20. The storage system of claim 17, further comprising means for adding the unused space to a counter, wherein the virtual cluster is created after a value of the counter reaches a second threshold.

* * * * *